W. L. CROUCH.
VALVE AND VALVE GEAR.
APPLICATION FILED NOV. 17, 1910.

1,038,533.

Patented Sept. 17, 1912.
4 SHEETS—SHEET 2.

Witnesses.
E. B. Gilchrist
H. R. Sullivan

Inventor.
Walker L. Crouch
by Thurston & Kwis
Attys.

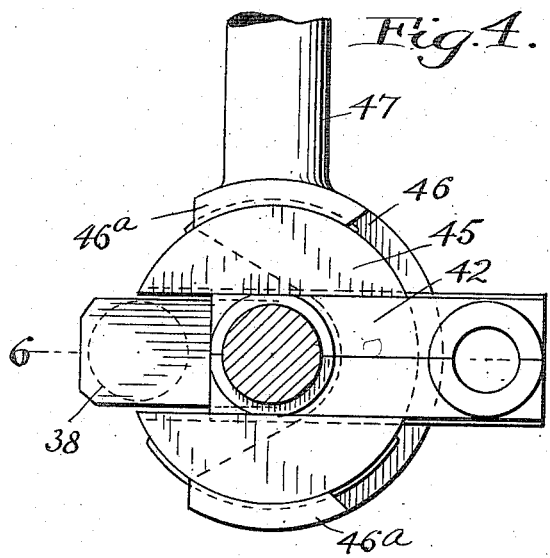
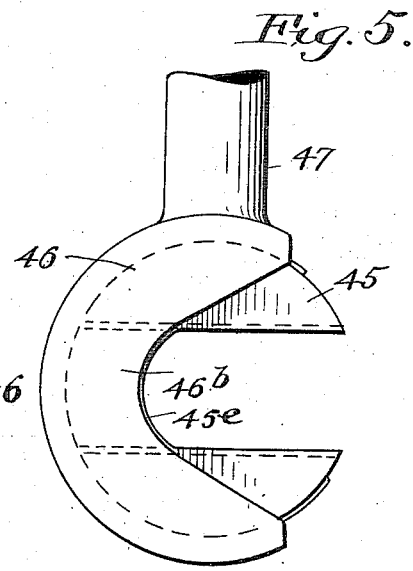
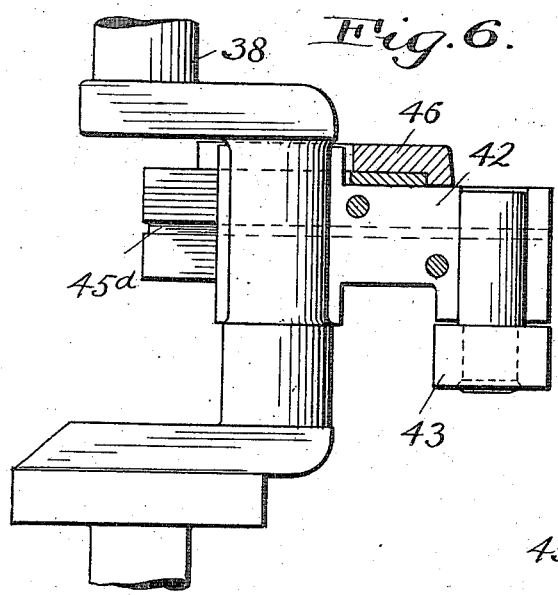
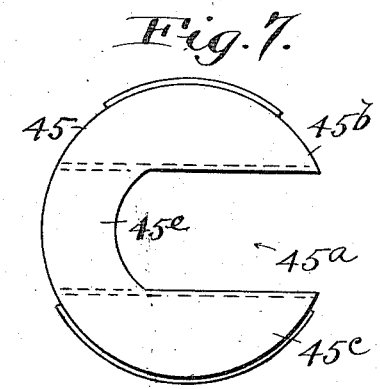
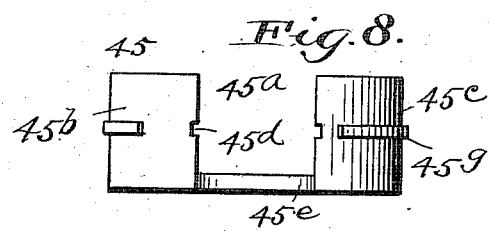

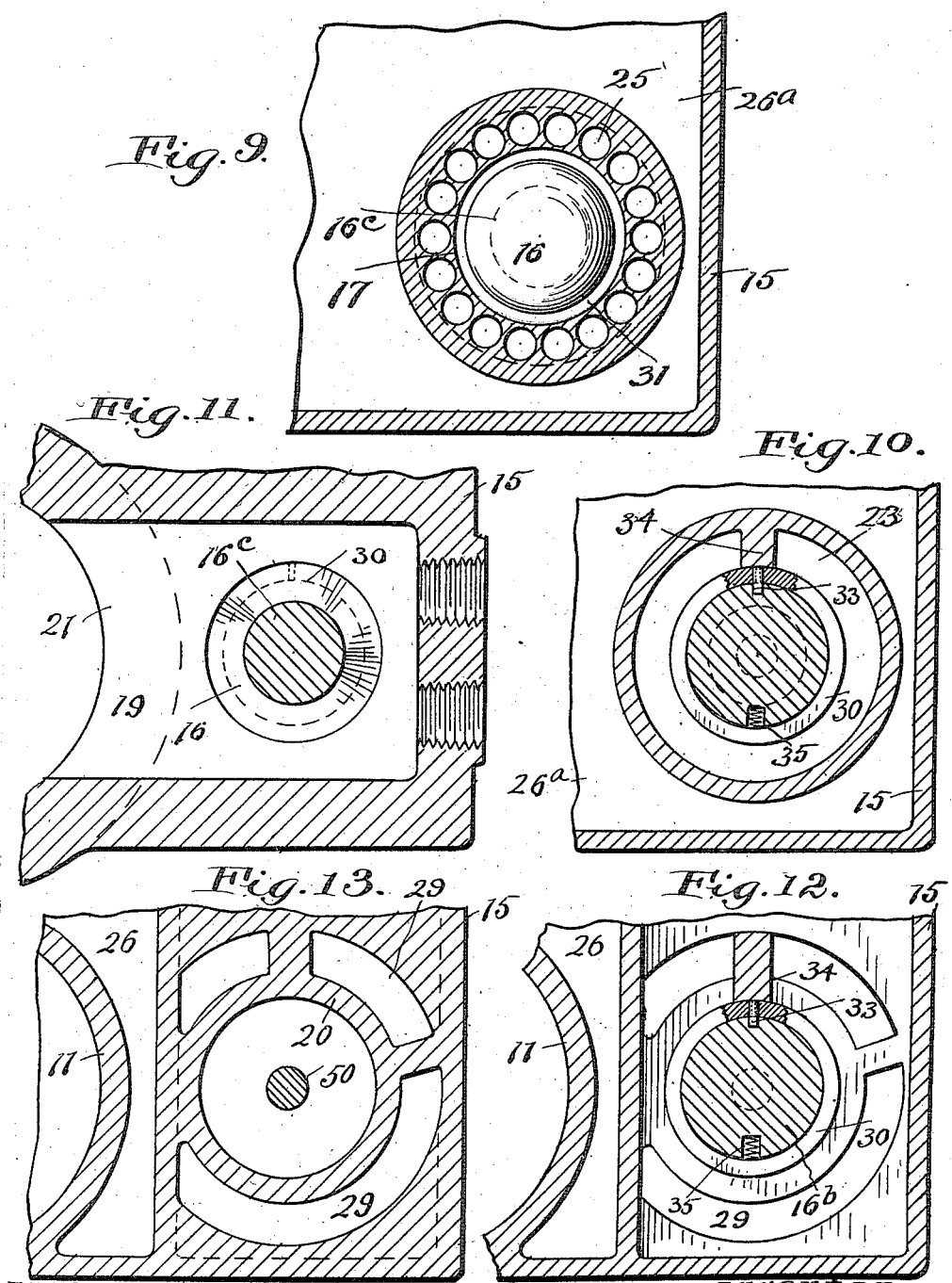

UNITED STATES PATENT OFFICE.

WALKER L. CROUCH, OF CLEVELAND, OHIO.

VALVE AND VALVE-GEAR.

1,038,533.  Specification of Letters Patent.  Patented Sept. 17, 1912.

Application filed November 17, 1910. Serial No. 592,770.

*To all whom it may concern:*

Be it known that I, WALKER L. CROUCH, a citizen of the United States, residing at Cleveland, in the county of Cuyahoga and State of Ohio, have invented a certain new and useful Improvement in Valves and Valve-Gears, of which the following is a full, clear, and exact description.

This invention relates to a valve and valve gear adapted particularly for internal combustion engines and has for one of its objects to provide a valve mechanism including the valve and valve gear, which is practically noiseless, efficient and very satisfactory in operation, which permits a wide range in speed, is simple in construction and consists of a less number of working parts than the valve mechanisms ordinarily employed.

Further, the invention aims to do away with the necessity for cams and springs for opening and closing the valves, to provide a single valve which controls both the admission and exhaust, thus doing away with the necessity for two and three valves for each cylinder, which is perfectly balanced and therefore requires little power to operate it, which is moved by the valve gear positively fixed or predetermined amounts in both directions, and which is so constructed as to permit the use of large valve openings which offer a minimum resistance to the admission to or exhaust of gases from the cylinder.

A further object is to provide a simple valve gear which includes a continously rotating crank shaft geared to the main shaft, and other coöperating parts which are arranged and operated in a manner such that the valve which has an operative connection with these parts is at certain instants reciprocated with respect to the valve ports, so as to permit the admission and exhaust to take place at the proper intervals and in a very effective manner, while between the movements necessary to properly control the ports, it is substantially stationary, even though the actuating crank shaft rotates continuously, as before stated.

The above and other objects are accomplished by my invention which may be briefly summarized as consisting in certain novel details of construction and combinations and arrangements of parts which will be described in the specification and set forth in the appended claims.

Figure 1:
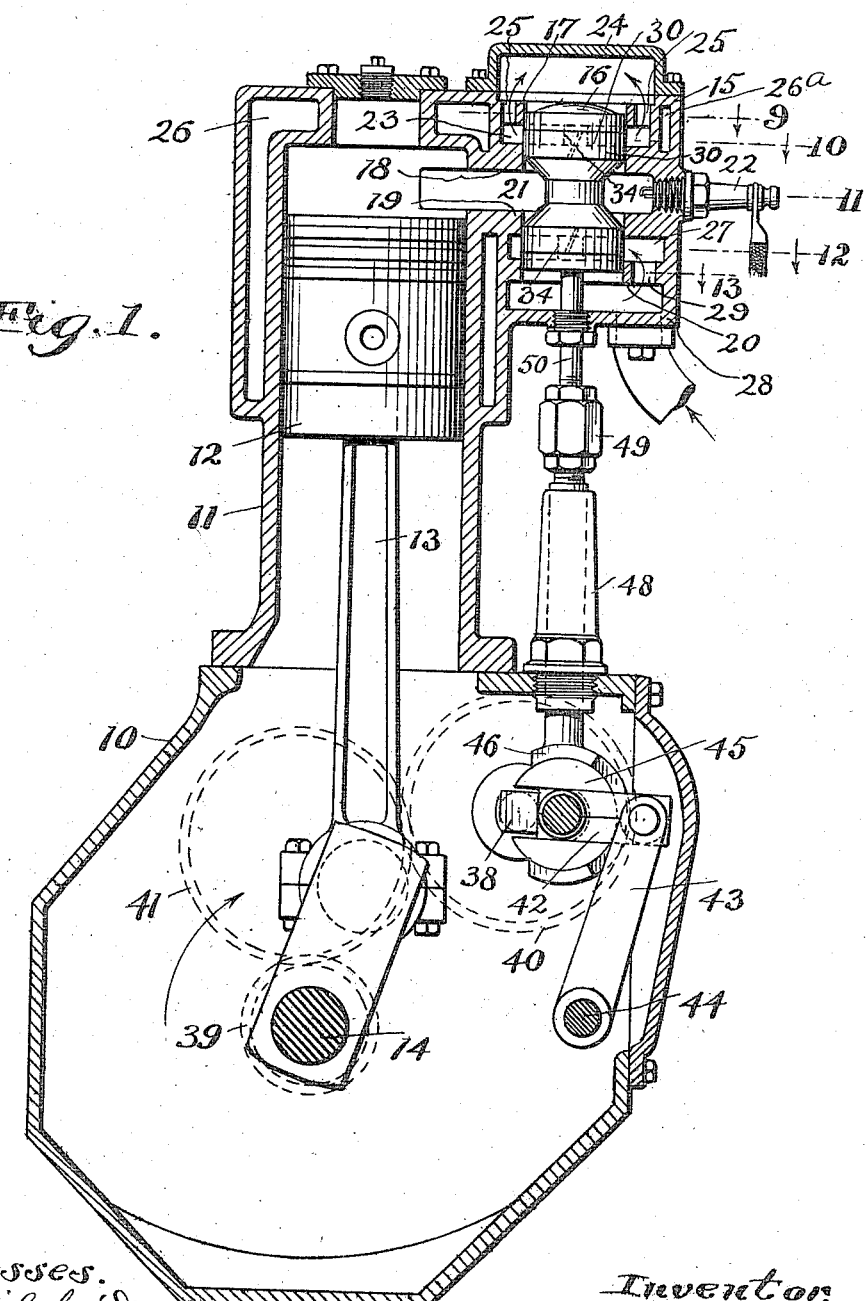
Figure 2:
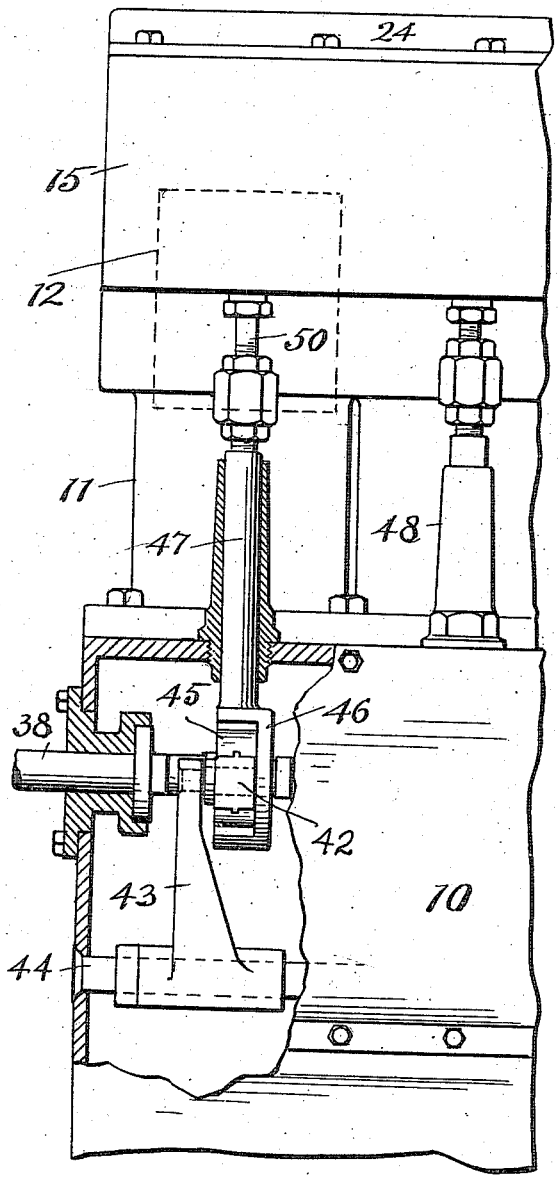
Figure 3:
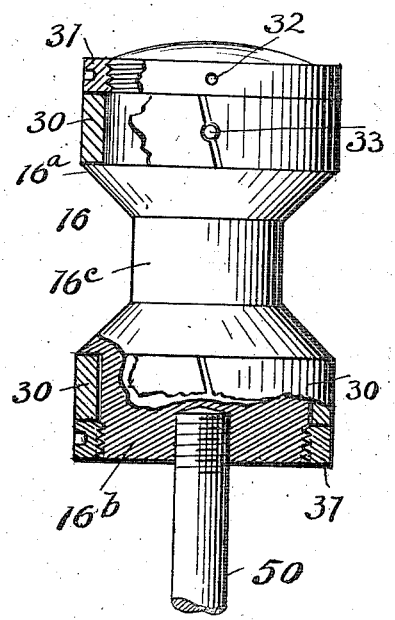

In the accompanying sheets of drawings wherein the preferred embodiment of my invention is shown, Figure 1 is a vertical sectional view through a four-cycle engine equipped with my improved valve and valve gear; Fig. 2 is a front elevation of the same, portions being broken away and in section, two cylinders of the engine being shown in this figure; Fig. 3 is a face view on an enlarged scale of the double piston or cylindrical valve which is employed for each cylinder, portions being broken away and in section; Fig. 4 is a sectional view on an enlarged scale taken through the valve actuating crank shaft and showing a portion of the valve gear and of the valve rod, the parts being in the position shown in Fig. 1; Fig. 5 is a view of the lower or yoke portion of the valve rod, together with an annular swiveled member which is received and held thereby, these parts being shown in Fig. 4, but turned 180° from the position there shown; Fig. 6 is a sectional plan view substantially along the line 6—6 of Fig. 4, looking in the direction indicated by the arrow; Fig. 7 is a detached view of the swiveled member which is received and adapted to be rocked or oscillated in the yoke of the valve rod; Fig. 8 is an edge view of the same; Fig. 9 is a sectional view through the valve casing substantially along the line 9 of Fig. 1, looking in the direction indicated by the arrow; Fig. 10 is a similar view through the valve casing and valve substantially along the line 10 of Fig. 1; Fig. 11 is a similar view substantially along the line 11 of Fig. 1; Fig. 12 is a similar view substantially along the line 12 of Fig. 1; Fig. 13 is a similar view substantially along the line 13 of Fig. 1.

Referring now to the figures of the drawing, 10 represents the base or crank case of the engine which may have any number of cylinders 11, in each of which is adapted to be reciprocated a piston 12 connected, by the usual connecting rod 13, to a crank shaft 14. In this case integral with the cylinder or cylinder casting, is a valve chamber or casing 15 in which is adapted to be reciprocated so as to control both the inlet and exhaust of the engine, a double cylinder or piston valve, designated as a whole by the reference character 16, the valve being shown in its middle position in Fig. 1. The valve casing has on its interior four annular bearing flanges for the valve,—these flanges being designated 17, 18, 19 and 20. Between the bearing flanges 18 and 19 is a port or passageway 21 which is arranged substantially centrally of the valve casing and communicates with the cylinder near its upper end, this port or passageway 21 constituting a common passageway both for the inlet and exhaust. I prefer also that this passageway form part of the ignition space or chamber and therefore I locate the spark plugs 22 in the wall of the valve chamber so that the inner end of the plug extends into the passageway 21. Between the bearing flanges 17 and 18 is an annular exhaust port or passageway 23, which is adapted to be placed into communication with the main or central passageway 21 when the valve is moved upwardly a sufficient distance and which communicates with an exhaust manifold 24 through a series of openings 25 extending through the upper bearing flange 17. These exhaust openings 25 extending between the passageway 23 and the exhaust manifold 24 are preferably closely arranged throughout the entire flange 17, as shown in Fig. 9, so that the heat of the exhaust will be very readily dissipated into the contiguous walls of the valve chamber and cylinder. To further enhance the dissipation of heat, the water jacket 26 of the cylinder has a portion 26$^a$ which envelops or passes entirely around the upper portion of the valve chamber, as shown in Figs. 1, 9, and 10 so that the water may circulate around the parts of the valve and valve chamber most likely to be heated. Between the annular bearing flanges 19 and 20 is an annular inlet port or passageway 27 which is designed to be placed into communication with the main central passageway 21 when the valve is lowered sufficiently, and which communicates with an inlet manifold 28 through one or more arc-shaped slots 29, shown most clearly in Figs. 1 and 13.

By referring particularly to Fig. 3, as well as to Fig. 1, it will be noted that the double piston valve 16 is provided at its ends with enlargements 15$^a$ and 16$^b$ one of which is designed to slide over the annular surfaces of the two lowermost bearing flanges, and the other of which is designed to slide over the annular bearing surfaces of the two upper bearing flanges. Between the ends of the valve is a reduced portion 16$^c$ which, when the valve is lowered to the proper position is designed to place the main central passageway 21 into communication with the inlet port, and when moved upwardly a sufficient distance is designed to place this passageway 21 in communication with the exhaust port. The valve is provided also on the two enlarged end portions with expansible split rings 30, each of which is designed to be held between a shoulder and a nut 31 screwed onto the end of the valve. These nuts which may be held or fixed in position by pins 32, can be adjusted when adjustment is necessary so as to take up any looseness in the rings. The two rings are placed in the valve so that their joints are in line with each other, or on the same side of the valve, and the rings are prevented from turning so that the joints will not get out of alinement by pins 33, which while preventing the rings from turning on the valve, permit them to expand or contract. These rings are designed to fit closely onto the inner surfaces of the bearing flanges and prevent any leakage taking place between the rings and the flanges over which they slide. To avoid leakage taking place through the joints in the rings, ribs 34 (see Fig. 1 and Fig. 10) are provided between the flanges 17 and 18 and the flanges 19 and 20, and when the valve is placed in the valve casing, these joints in the rings are arranged so that they will be opposite or be covered by these ribs. The object of preventing a rotary movement of the rings and of providing the joints on the same side of the valve is therefore evident. To further prevent leakage of exhaust or fresh gases at the joints and specifically to insure that the gaps or joints in the rings will be flush with the ribs 34, I prefer that a small spring, preferably a coil spring 35, be arranged beneath each one of the rings, and diametrically opposite to the joint, as shown clearly in Fig. 10.

My improved valve gear for actuating the double piston valve includes a crank shaft 38 which is designed to be driven continuously from the main crank shaft 14 by a two-to-one gearing so as to be driven at half the speed of the main crank shaft; said gearing including in this case, a gear 39 on the crank shaft 14, a gear 40 on the valve crank shaft 38, the latter being twice the size of the gear 39, and an intermediate idler gear 41. This valve crank shaft may be utilized for actuating the valves such as the one described for any number of cylinders, and one set of gears will ordinarily be sufficient to transmit movement between the main crank shaft and the valve crank shaft. It is understood, of course, that for a four cycle engine, a direct connection between the valve crank shaft and the valve is impossible for the reason that the valve must open and close the exhaust and inlet ports at the proper intervals and it must throughout, or substantially throughout the compression and working strokes be practically stationary so as to maintain the ports closed.

The mechanism which I shall now describe for actuating each of the valves from the rotating valve crank shaft and for forming with the crank shaft the valve gear, answers the requirements very effectively. Referring particularly to Figs. 1 and 2, and Figs. 4 to 8, it will be seen that the valve gear for each valve includes in addition to the crank shaft, a link 42 which at one end is loosely or pivotally connected to the crank, and at its opposite end is pivotally connected to one end of an arm 43, the opposite end of which has a fixed pivotal axis, being pivotally connected to a fixed rod 44 which extends lengthwise of the crank case and forms a common support for all of the arms 43 for the different valves. It will be seen that by the rotation of the valve crank shaft 38, this link 42 will be given a combined rocking and endwise movement, the movement of the link being controlled by the crank and by the pivoted arm 43. The link 42 in its endwise movement is adapted to slide through a slot 45$^a$ of a member 45, which is supported by and has a swiveled connection with a substantially annular yoke shaped portion or socket 46 of a valve rod 47 which is guided for longitudinal movement by a sleeve or bushing 48 and is adjustably connected by a coupler or connector 49 to a valve stem 50 attached to the valve 16. The swiveled member 45, includes two segment shaped portions 45$^b$ and 45$^c$ which are spaced apart the width of the slot 45$^a$ previously referred to and have on their inner parallel faces guide grooves 45$^d$ which receive ribs on the sliding and oscillatory link 42. These segments 45$^b$ and 45$^c$ are connected together as shown in Figs. 7 and 8 by a narrow, thin web 45$^e$. This member 45 is, as shown most clearly in Fig. 7, substantially annular in shape, so that it may readily oscillate or swivel in the yoke 46 of the valve rod, the yoke having a pair of oppositely disposed arc-shaped flanges 46$^a$ on the inner surfaces of which the member 45 is adapted to turn, and being provided with a rather thin base portion 46$^b$ having a substantially V-shaped or flaring slot, so as not to interfere with the movement of the crank. Furthermore, the segment shaped sides 45$^b$ and 45$^c$ of the swiveled member are provided on their outer curved surfaces with ribs 45$^g$ which engage within suitable guide slots in the flanges 46$^a$. With this mechanism, the crank of the valve crank shaft, together with the coöperation of the pivoted arm 43, causes the link 42 to have an oscillatory and endwise movement, and as the link 42 is thus shifted, it moves through the slot 45$^a$ of the swiveled member 45, and also causes said member 45 to be rocked or oscillated in the yoke 46 of the valve rod, and at certain times to be moved bodily in a vertical direction so as to cause the valve rod to have the desired endwise movements to positively move the valve at the proper intervals and the proper amounts to control the exhaust and admission of gases from and to the cylinders in a very effective manner.

Although I do not desire to be limited to the relative lengths and arrangements to be referred to, I find that the following gives very satisfactory results. It will be noted in Fig. 1 that the axis of the valve crank shaft is offset from the axial line of the valve rod and valve a distance substantially equal to the length of the crank of the valve crank shaft, and in the position shown, the crank is in line with the axis of the valve rod. I prefer also that the length of the link 42 be substantially twice the length of the crank, and that the pivotal axis of the arm 43 be also offset from the axis of the valve rod, but on the side of the valve rod opposite to that on which the axis of the valve crank shaft is located. When the parts are in the position shown in Fig. 1, the piston is just at the beginning of the suction stroke, and the valve is in its substantially middle position with the inlet and exhaust ports closed, the valve when in its mid-position overlapping slightly both the inlet and the exhaust ports. It will be noted that inasmuch as the crank is at this time in line with the valve rod, the movement of the valve is for a short period nearly equal to the angular movement of the crank. Consequently, with the valve gear in the position shown, the valve will be moved very quickly and during a very slight downward movement of the piston from the position shown, the valve will be lowered and a quick opening of the inlet port will take place, the reduced portion of the valve placing this inlet port in communication with the main central port 21 leading to the cylinder. The inlet port will remain open until the piston nearly completes the suction stroke, at which time the main crank will be nearly 180° from the position shown in Fig. 1, and the crank of the valve crank shaft will be nearly 90° from the position shown. However, before the valve crank turns 90° from the position shown in Fig. 1, the piston valve starts on its upward movement to close the inlet port, and shortly after the end of the suction stroke, or shortly after the beginning of the compression stroke, the inlet port is again closed and the valve is moved to substantially the mid-position. During the remaining portion of the compression stroke, and until nearly the end of the working stroke, the axis of connection between the pivotal arm 43 and the link 42 is in a position substantially in line with the axis of the valve rod so that during these strokes, or during the portions of these strokes stated, and while the crank of the valve crank shaft is swinging through quite a large arc, there is no endwise movement or practically none imparted to the valve rod, and consequently the valve remains practically stationary. If there is any slight movement given to the valve at this time, it is less than the lap of the valve, so that the movement will not cause either port to be placed in communication with the main central port 21. Therefore when the crank of the valve crank shaft is in the position 180° from that shown in Fig. 1, and in fact is swinging through a considerable arc on each side of the position 180° from that shown, the link 42 is simply rocked about the pivotal connection between the link and the arm 43, and as this pivotal connection is now in line or substantially in line with the valve rod, the swivel member 45 is simply rocked in the yoke, imparting no endwise movement to the valve rod. Near the end of the working stroke, and just before the valve crank shaft reaches a position 270° from the position shown in Fig. 1, the valve is moved upwardly so as to open the exhaust port, and the exhaust port then remains open throughout nearly the exhaust stroke of the piston. As the valve crank moves through the last quarter of its movement, it closes the exhaust port, and when it reaches the position shown in Fig. 1, the valve is again in its mid-position, and is about to move downwardly from that position so as to open the inlet port, the piston being then just starting on its suction stroke.

It will be seen from the above that although the actuating valve crank shaft is driven continuously by the main crank shaft, because of the particular form of valve gear described, the double piston valve is reciprocated at the desired intervals, and in the proper directions to cause the exhaust and inlet of gases to take place at the proper time, and at other times, the valve is practically stationary, maintaining the exhaust and inlet ports closed. I am therefore enabled to do away with the cam shafts and with the use of cams and springs for operating the valve or valves. The valve gear is noiseless and as the valve is not opened against the tension of a spring, and as, in fact, it is balanced, very little power of the engine is required to operate it. This has much to do with the high efficiency of an engine constructed in accordance with my invention. Further, by providing a single valve, controlling both the inlet and exhaust, and by my novel and peculiar valve gear which operates the valve in a proper manner, I am enabled to reduce the number of valves heretofore generally considered necessary in a successful internal combustion engine, and therefore to reduce the number of working parts and the cost of the engine, and consequently the liability of disarrangement or of parts getting out or order.

By means of the valve and valve gear, as explained, the use of large inlet and exhaust ports is possible, and as the valve gear causes the ports to be opened and closed very quickly, there is a minimum resistance to the passage of gases to and from the cylinder, and largely to this I attribute the fact that I have been enabled to obtain a much wider range in speed than has been obtainable from all the different makes of engines with which I am familiar. A further advantage of my improvements resides in the fact that the valve is moved positively in both directions, and the extent of movement in each direction is fixed. I am in this manner enabled to determine and govern the extent of the port opening and almost the exact period that the port is opened or closed. Furthermore, in view of the manner in which the exhaust takes place, and the manner in which the valve chamber is cooled, the valve does not become excessively heated, as might be supposed when it is realized that the ignition takes place in the valve chamber. I have found, however, that the valve does not become hot, not only because the heat is dissipated in the casting and because it is cooled by the water jacket, but also because the incoming fresh gases have a material cooling effect. Furthermore, there is no liability of the valve sticking for the reason that unequal expansion and contraction is readily taken care of by the expansible rings, which, as before stated, are so arranged as to eliminate leakage. Another advantage of this particular type of valve resides in the fact that because the valve has a sliding motion over the annular bearing flanges, the bearing surfaces are maintained in clean condition and there can be no deposit of carbon which would interfere with the proper closing and opening of the valve ports.

Not only is the construction simple as regards the numbr of parts and their arrangement, but the valve gear is strong and powerful, is durable, and not liable to get out of order. It will be noted that the rings of the valve are wider than the inlet and exhaust ports, and therefore each ring always overlaps one or both sides of the corresponding port. This does away with the necessity for ribs or bridges extending across the port or between the sides of the latter for the purpose of supporting the rings, and therefore does away with the unequal wear on the rings which results from the use of supporting bridges. Furthermore, by the use of a single valve of the type shown for controlling both the inlet and exhaust ports, it is impossible that both ports be open at the same time, as might be the case in an engine having separate valves for controlling the exhaust and inlet, and therefore it is practically impossible for back firing to take place.

I do not desire to be confined to the exact details, arrangements or proportions shown and described, but aim in my claims to cover all modifications which do not involve a departure from the spirit and scope of my invention.

Having thus described my invention, what I claim is:

1. The combination in an internal combustion engine, a cylinder, a valve chamber, a reciprocating valve in said chamber controlling both the admission and exhaust of gases, and a valve gear for actuating the valve comprising a crank, a pivoted arm, a link connected at one end to the crank and at its opposite end to the arm, and a valve rod having at its end means forming a connection with said link.

2. In combination in an internal combustion engine, a cylinder, a reciprocating valve controlling the exhaust and admission of gases, a valve rod connected to the valve, and a valve gear comprising a rotating crank, a pivoted arm, a link pivotally connected to the crank and to the arm, a swiveled member carried by the valve rod and having a groove which receives and along which the link is adapted to slide.

3. In combination in an internal combustion engine, a cylinder, a valve chamber, a double piston valve therein controlling both the exhaust and admission of gases, a valve rod connected to the valve, a valve gear comprising a rotating crank, a member connected thereto and adapted to be given an oscillatory and endwise movement, a substantially annular yoke at the end of the valve rod, a substantially annular swiveled member seated in said yoke and provided with a transverse slot which receives and along which said member is adapted to slide.

4. In combination in an internal combustion engine, a cylinder, a reciprocating valve controlling the admission and exhaust of gases to and from the cylinder, a valve gear comprising a crank shaft, a crank, a pivoted arm, a link connected to the crank and to said arm, a valve rod connected to the valve, a swiveled member carried by the valve rod and having a relatively sliding engagement with the link, the axis of the crank shaft being offset from the valve rod a distance substantially equal to the radius of the crank.

5. In combination in an internal combustion engine, a cylinder, a reciprocating valve controlling the admission and exhaust of gases to and from the cylinder, a valve gear comprising a crank shaft, a crank, a pivoted arm, a link connected to the crank and to said arm, a valve rod connected to the valve, a swiveled member carried by the valve rod, and having a relatively sliding engagement with the link, the axis of the crank shaft being offset from the valve rod a distance substantially equal to the crank radius and the distance between the connections of the link with the crank and arm being substantially twice the crank radius.

6. In combination in an internal combustion engine, a cylinder, a reciprocating valve controlling the admission and exhaust of gases to and from the cylinder, a valve rod connected to the valve, a valve gear comprising a crank shaft, a crank, an arm pivoted at a stationary point, the axis of the crank shaft being displaced from the line of the valve rod substantially the length of the crank radius, and the pivotal axis of the arm being displaced from the valve rod, a link connected to the crank and to the free end of the arm, the distance between the connections of the link with the crank and arm being substantially twice the crank radius, a socket at the lower end of the valve rod, a swiveled member in said socket, said member having a groove extending transversely across the same, and receiving the link which is adapted to slide in said groove.

In testimony whereof, I hereunto affix my signature in the presence of two witnesses.

WALKER L. CROUCH.

Witnesses:
H. R. SULLIVAN,
A. F. KWIS.

Copies of this patent may be obtained for five cents each, by addressing the "Commissioner of Patents, Washington, D. C."